US007182018B2

(12) United States Patent
Ackley, Jr. et al.

(10) Patent No.: US 7,182,018 B2
(45) Date of Patent: *Feb. 27, 2007

(54) APPARATUS FOR PRINTING MULTICOLOR IMAGES ON EDIBLE PIECES

(75) Inventors: E. Michael Ackley, Jr., Moorestown, NJ (US); Samuel J. Louden, Moorestown, NJ (US); James M. Suttle, East Stroudsburg, PA (US); Michael E. Webster, Blairstown, NJ (US); Neil A. Willcocks, Flanders, NJ (US); Michael S. Wozniak, Hackettstown, NJ (US)

(73) Assignees: Mars Incorporated, McLean, VA (US); Ackley Machine Corporation, Moorestown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/619,571

(22) Filed: Jul. 16, 2003

(65) Prior Publication Data

US 2004/0013778 A1 Jan. 22, 2004

Related U.S. Application Data

(62) Division of application No. 09/479,549, filed on Jan. 7, 2000.

(51) Int. Cl.
*B41F 17/00* (2006.01)
(52) U.S. Cl. .......................................... 101/35; 101/44
(58) Field of Classification Search ................... 101/35, 101/36, 37, 38.1, 40, 40.1, 43, 44
See application file for complete search history.

(56) References Cited

U.S. PATENT DOCUMENTS

| | | | |
|---|---|---|---|
| 1,334,822 A | 3/1920 | Varble | |
| 2,613,594 A * | 10/1952 | Emerson | 101/44 |
| 3,052,552 A | 9/1962 | Koerner et al. | |
| 3,215,536 A | 11/1965 | Simeone et al. | |
| 3,335,658 A | 8/1967 | Uschmann | |
| 3,735,699 A | 5/1973 | Koelschbach | |
| 4,397,871 A | 8/1983 | Meyer et al. | |
| 4,519,310 A | 5/1985 | Shimizu et al. | |
| 4,528,904 A | 7/1985 | Ackley | |
| 4,578,273 A | 3/1986 | Krubert | |
| 4,619,196 A * | 10/1986 | Matsuoka | 101/35 |
| 4,632,028 A * | 12/1986 | Ackley | 101/40 |
| 4,670,271 A | 6/1987 | Pasternak | |
| 4,672,892 A | 6/1987 | Ackley | |
| 4,843,958 A | 7/1989 | Egosi | |
| 4,855,146 A | 8/1989 | Murakami et al. | |
| 4,905,589 A * | 3/1990 | Ackley | 101/35 |
| 5,165,340 A | 11/1992 | Karlyn et al. | |
| 5,376,388 A | 12/1994 | Meyers | |
| 5,423,252 A | 6/1995 | Yamamoto et al. | |
| 5,429,045 A | 7/1995 | Karlyn et al. | |
| 5,433,146 A | 7/1995 | Ackley | |
| 5,505,775 A | 4/1996 | Kitos | |
| 5,534,281 A | 7/1996 | Pappas et al. | |
| 5,553,536 A | 9/1996 | Van Os | |
| 5,630,499 A | 5/1997 | Louden et al. | |
| 5,655,453 A | 8/1997 | Ackley | |
| 5,730,048 A | 3/1998 | Averill et al. | |
| 5,768,996 A | 6/1998 | Ackley | |
| 5,834,047 A | 11/1998 | Ahn | |
| 5,836,243 A | 11/1998 | Ackley | |
| 5,878,658 A | 3/1999 | Ackley | |
| 5,894,801 A | 4/1999 | Ackley | |
| 6,267,997 B1 * | 7/2001 | Ream et al. | 426/3 |
| 6,314,876 B1 | 11/2001 | Ackley | |

FOREIGN PATENT DOCUMENTS

| | | |
|---|---|---|
| DE | 3836142 A1 | 4/1990 |
| EP | 0442782 A1 | 8/1991 |
| EP | 0596328 A2 | 5/1994 |
| EP | 091377 A1 | 6/1999 |
| JP | 62-138279 | 6/1987 |
| WO | WO 81/01232 | 5/1981 |
| WO | WO91/01884 | 2/1991 |
| WO | WO 97/16075 | 5/1997 |
| WO | WO00/74938 | 12/2000 |

* cited by examiner

*Primary Examiner*—Ren Yan
(74) *Attorney, Agent, or Firm*—Fitzpatrick, Cella, Harper & Scinto

(57) ABSTRACT

Multicolor image, formed from at least two component images, are printed on non-planar surfaces of edible pieces by maintaining registration of the pieces from one printing station to another. The registration is maintained by firmly securing the pieces to the transporting surface by applying a pressure differential, by a combination of a pressure differential with a resilient surface, or by trapping the pieces between a retaining member and a recess portion.

14 Claims, 11 Drawing Sheets

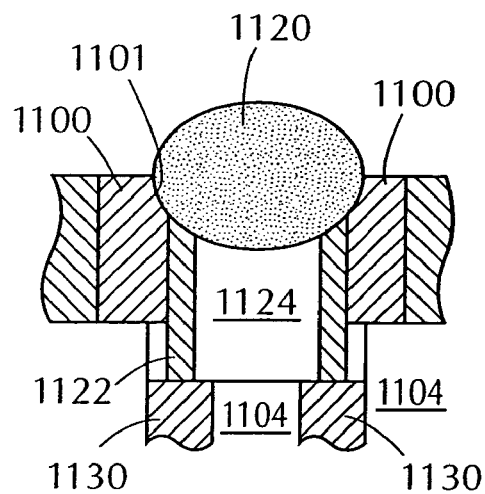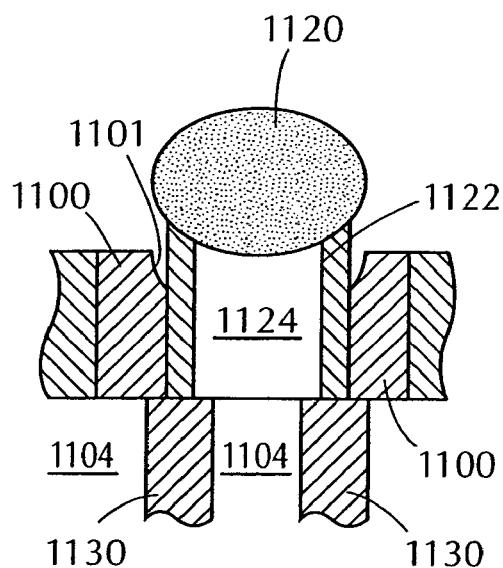
FIG. 11A  FIG. 11B
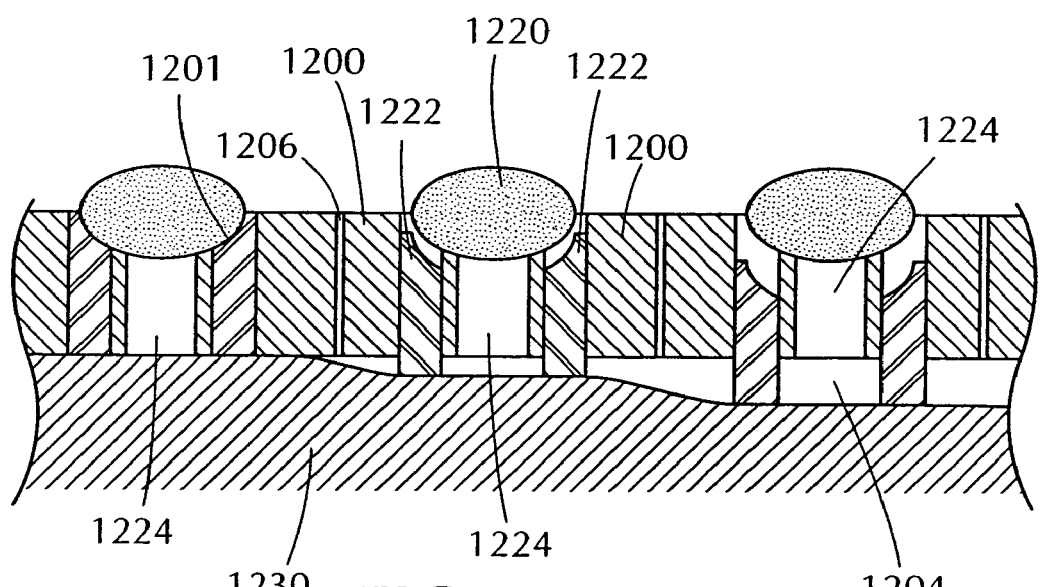
FIG. 12

APPARATUS FOR PRINTING MULTICOLOR IMAGES ON EDIBLE PIECES

This application is a division of application Ser. No. 09/479,549 filed Jan. 7, 2000, which is incorporated by reference.

BACKGROUND OF THE INVENTION

1. Field of the Invention

The present invention relates to a method of printing images onto edible pieces. Most preferably, this invention relates to the method of forming multicolor images on non-planar surfaces of confectionery and pharmaceutical pieces/tablets. The invention also relates to an apparatus for practicing the method of the invention and to edible shaped pieces having a multicolor registered composite image on a non-planar surface thereof.

2. Related Background

Many edible items ("pieces") have a sugar shell outer coating. Such outer sugar shells serve many functions, including preserving the inner ingredients and presenting an attractive exterior. Further, the outer sugar shell can serve as a substrate on which an image or design is formed. Such images or designs can be, for example, an identifying trademark such as the "M" on M&M's® Chocolate Candies pieces, or marks to identify the inner ingredients in the case of drugs or dietary supplements.

Many methods are known to form a one-color design on to an edible piece. U.S. Pat. No. 3,052,552, for example, describes a method of printing chewing gum slabs prior to the slabs being cut into sticks of individual gum pieces.

U.S. Pat. No. 5,834,047 describes a method of imprinting shapes of multiple colors inside confectionery products by partially filling and solidifying a confectionery material in a mold, dispersing edible ink onto the solidified mixture through an etched plate, and filling the remainder of the mold with confectionery material.

It would be desirable to form multicolor designs on surfaces of edible pieces, particularly non-planar surfaces, at high production speeds. Multicolor designs are conveniently produced by the application of a sequence of images, each image being a single color. The cumulative effect is of a multicolor image or design. Such multiple applications of images require that each applied image be in registry with the previously applied images and with any subsequently applied images to achieve the desired composite image. Images applied out of registry will result in smearing, skewing, overprinting, or other erroneous and faulty results.

Many multicolor printing methods are known in the graphic arts for non-food products. These methods include relief printing, stamp-printing, offset printing, pad printing, flexographic printing, gravure printing, inkjet printing, and silk-screen printing. Direct transfer of such methods to multicolor printing on edible pieces, however, is difficult—particularly for printing onto non-planar surfaces. The handling of edible pieces entails different considerations from the handling of paper or polymer sheets. Generally, edible pieces require more careful handling to prevent damage or misshaping of the pieces. Further, handling food generally require higher cleanliness.

Methods are known to perform multiple printing onto large solid articles such as bottles and other storage cylinders. U.S. Pat. No. 3,335,658 describes a machine that conveys individual articles, on a disk or endless band, through printing stations and drying stations that are placed at specific distance increments that are not evenly divisible into the periphery distances of the disk or endless band. U.S. Pat. No. 3,735,699 describes an apparatus that applies rolling contact between an article held by a mechanical holder and intermediate belt or rollers. The belt or rollers transfer images onto the contacted, mechanically held article. U.S. Pat. No. 4,519,310 describes transferring a plurality of ink onto the outer periphery of a single ink form roller, pressing a cylindrical container against the ink form roller, and rotating the cylindrical container to transfer the ink images onto the cylindrical container. The above patents are incorporated by reference herein.

Methods are also known to form multicolor images on large food items such as cakes and cookies. U.S. Pat. No. 4,578,273 describes a method of printing by forming a hard, nonporous icing surface and printing one or more edible inks onto the hard surface of the icing. Each piece is manually placed onto a moving mandrel for printing by a pan flex printer. U.S. Pat. No. 4,670,271 describes a food imprinting cassette that transfers an edible coloring material to food when pressure from a stylus is applied to the flexible transfer sheet on which is the coloring material. U.S. Pat. No. 5,534,281 describes a method of making printed foods with a rotary printer that is synchronized with a dough-forming apparatus such as a rotary cutter or rotary molder. U.S. Pat. No. 5,505,775 describes a cake decorating system incorporating a traveling arm extending over the cake surface to carry a colorant cartridge with a drop on demand colorant expulsion system under the control of a central processor. A multiple orifice drop on demand colorant expulsion system allows one pass three color printing. The above patents are incorporated by reference herein.

Other methods are known to form multicolor designs onto flat sheet surfaces of confections. International Patent Publication No. WO 97/16075 describes multicolor printing onto flat sheets of bubble gum situated in a recess having dimensions larger than that of the flat sheets of bubble gum. A guide rail is used to laterally shift the bubble gum sheets against a common side of the recess before printing, but no means are provided to prevent longitudinal shifting, skewing or yawing since the recesses are larger than the bubble gum. It is indicated that a vacuum system inside the apparatus could be used to remove excess starch that falls between the slats of the conveyor bed and that, while dedusting, this vacuum would help hold the gum sheets on the conveyor. However, there is no disclosure or suggestion of a shaped pocket that positions an edible piece in a predetermined position, both laterally and longitudinally without skewing or yawing, and that includes an opening in communication with a vacuum that maintains the registration of an edible shaped piece between a first printing station and a second printing station.

The methods presently available for printing multicolor images onto edible pieces, and particularly onto non-planar surfaces of edible pieces, are limited in their production rates. Multicolor printing on individual pieces require an alignment of each piece within the geometries of each printing step. Such alignment is known as registration. Multicolor printing requires registration in many directions. Further, unlike printing onto flat planar surfaces, printing onto non-planar surfaces requires an added registration alignment in regard to the contour of the non-planar surface. The piece must not be allowed to rock, yaw, or skew from one printing station to the next.

Generally, in mass production the multitude of pieces are moved in relation to the usually stationary print station. Many methods are known to transport pieces, as described in the above patents. U.S. Pat. No. 5,836,243, incorporated by reference herein, describes a pellet conveyor made up of a plurality of carrier bars each having a surface defining a plurality of pockets. A brush is described that facilitates seating of the pellets in the pockets.

U.S. Pat. No. 4,671,892, incorporated by reference herein, describes an apparatus for conveying and marking pellet-shaped pieces by utilizing two printing heads positioned along an arcuate transfer path about a transfer drum so as to apply single color indicia to opposite sides of the pellets. U.S. Pat. No. 5,423,252, incorporated by reference herein, describes a capsule or tablet (article) printer in which a vacuum is applied below a transporting belt to vacuum holes provided in article receiving pockets. In one embodiment, a first printing unit 110 prints on one side of the article, and another printing unit 110' prints on a second side of the article. However, there is no disclosure of applying a vacuum at and between the first and second printing units, registering the printing between the first and second sides of the article, or of the particular vacuum holes or carrier bars.

Most designs that incorporate component images to form, in combination, a multicolor composite image, require registration in many directions besides the longitudinal direction of movement of the pieces. There must be registration transverse to the longitudinal movement direction to prevent images being inadvertently offset. There also must be registration in the third coordinate orthogonal to the longitudinal movement direction and the transverse direction. Finally, particularly important for non-planar surfaces, there should be registration in regard to any of three rotational orthogonal axes centered at each piece.

The above described methods generally require that the individual pieces be mounted in a fixture or holder that mechanically fixes each piece in registration. The manually aligned methods are too slow for mass production rates except for food items made at low throughput such as cakes. The above mechanical attachment methods also require complex components that can become misaligned, broken, or jammed at high production speeds. Further, many food items are delicate and not amenable to such mechanical forces that may be needed to maintain adequate registration of printing at high production speeds.

U.S. Pat. No. 5,534,281 produces baked goods at moderate production rates by utilizing the inherent stickiness or tackiness of the dough, which must sufficiently adhere to the continuous web conveyor in order to ensure no relevant movement between the dough and the web, for proper alignment and registration with the printing apparatus. Methods that rely on the tackiness of the individual pieces or of the conveying belt are limited in their production speed because the various production steps must be carefully controlled to avoid breaking the adhesive bond between the individual pieces and the conveying belt. Further, the production speed is constrained by diametrically opposite considerations with regard to the stickiness of the adhesive bond. Higher printing speeds require higher levels of stickiness, but higher offloading speeds require lower levels of stickiness. In other words, higher stickiness holds the pieces in position more firmly to allow higher throughput in printing but higher stickiness prevents the pieces from being released quickly after their being printed. Thus, the above methods are incapable of multicolor printing onto surfaces of edible pieces, particularly onto non-planar surfaces of edible pieces, at high production speeds.

Presently, at high speed mass production, designs applied to non-planar surfaces of edible pieces are limited to one-color designs (or multiple independent designs that can be of different colors, but are unrelated to each other) because it is very difficult to apply consecutive images in registry to non-planar surfaces of edible pieces. That is, after the application of one image, the piece shifts or moves before the application of the next image, thereby causing the images to be out of registry. Accordingly, it would be desirable to provide a method to form multiple images in registry onto surfaces of edible pieces, and particularly onto non-planar surfaces of edible pieces, at high production rates.

SUMMARY OF THE INVENTION

This invention prints multicolor images, formed from at least two component images, on surfaces of edible pieces by maintaining registration of the pieces from one printing station to another. The registration is maintained by firmly securing the pieces to the transporting surface by, for example, applying a pressure differential and/or by applying a mechanical trapping of the pieces to a transporting recess.

This invention is directed to a method to form multiple images in substantial registration on edible pieces, by the steps of i) forming an image on a surface of an edible piece to form a printed piece at a first printing station, ii) transporting the printed piece to a second printing station and maintaining a registering relationship of the printed piece from the first printing station to the second printing station by applying a pressure differential to a portion of the piece effective to maintain the printed piece in a set position in a transporting recess; and iii) forming a second image on the printed piece while maintaining the registering relationship. In a preferred embodiment of this invention, the multiple images in substantial registration are formed on at least one non-planar surface of the edible pieces. In yet another embodiment of this invention, the printed piece is maintained in the set position against a resilient portion of the transporting recess.

Yet another embodiment of this invention is directed to a method of forming multiple images in substantial registration on edible pieces, by the steps of i) forming an image on a surface of an edible piece to form a printed piece at a first printing station; ii) transporting the printed piece to a second printing station and maintaining a registering relationship of the printed piece from the first printing station to the second printing station, by trapping the printed piece between a portion of a transporting recess and a retaining member; and iii) forming a second image on the printed piece while maintaining the registering relationship. Preferably, the printed surface of the edible piece is non-planar.

Another embodiment of this invention includes an apparatus for printing a multicolor image formed from at least two component images on at least one surface of a multitude of edible pieces. The apparatus includes a first printing station effective to print a first component image on a surface of the pieces at a first printing position and a second printing station effective to print a subsequent second component image on the surface of the pieces at a second printing position. A transporting surface moves the edible particles from the first printing position to the second printing position. The transporting surface includes a plurality of transporting recess portions, each recess adapted to accept a single edible piece. Preferably the recess portions are adapted to receive a shaped piece having at least one non-planar surface. Each transporting recess portion includes an opening which communicates with a vacuum source. A reduced pressure is applied to the opening effective to hold the piece in position to maintain a registering relationship of the first component image and the second component image on the surface of the piece. In a particularly preferred embodiment each transport recess includes a resilient portion. The resilient portion in cooperation with the reduced pressure retains the piece in the transporting recess portion in a set position during transport from the first printing station to the second printing station to maintain a registering relationship of the first component image and the second component image.

Still another embodiment of this invention includes an apparatus for printing a multicolor image formed from at least two component images on at least one surface of a multitude of edible pieces that includes a first printing station effective to print a first component image on the surface of the pieces at a first printing position and a second printing station effective to print a subsequent second component image on the surface of the pieces at a second printing position. A transporting surface for moving the edible pieces from the first printing position to the second printing position includes a plurality of transporting recess portions. There is at least one retaining member for each transporting recess portion effective to removably trap the edible piece in the transporting recess portion to maintain a registering relationship of the first component image and the second component image. Each transport recess portion is adapted to accept a single edible piece, and more preferably a single edible piece having at least one non-planar surface.

This invention is also directed to an edible shaped piece having a multicolored composite image formed from at least two component images of edible printing inks deposited on at least one non-planar surface of the edible shaped piece. Particularly preferred edible shaped pieces include shaped confectionery pieces and pharmaceutical capsules, caplets and tablets. More preferably, the edible pieces of this invention are lentil, oval, spherical, or the like shaped confectionery, most preferably sugar shell coated confectionery such as for example, M&M's® Chocolate Candies pieces, Skittle® candies and the like.

As used herein, shaped edible piece means an edible piece that is not substantially in the form of a sheet. Such a piece may have planar surfaces, non-planar surfaces or a combination of planar and non-planar surfaces. It is an object of the present invention to include methods of handling and transporting shaped edible pieces which present technical challenges as compared with the handling and transporting of sheet-like pieces.

In preferred embodiments, the shaped edible pieces of the present invention have at least one non-planar printing surface. A non-planar surface, as used herein, is any surface having a radius of curvature.

BRIEF DESCRIPTION OF THE DRAWINGS

FIG. 11A is a schematic cross-sectional view of an embodiment of this invention.

FIG. 11B is a schematic cross-sectional view of an embodiment of this invention.

FIG. 12 is a schematic cross-sectional view of an embodiment of this invention.

DETAILED DESCRIPTION OF THE INVENTION

The method of this invention forms composite images, composed of at least two component images, on edible pieces by maintaining the orientation of each piece from one printing station to another printing station effective to substantially form each component image in registration to each other. The registration of each component image is maintained by causing each piece to remain in a constant orientation with respect to the surface that transports the pieces from printing station to printing station. The orientation of the pieces to the transporting surface is fixed by firmly securing each piece to a recess portion of the transporting surface.

As described above, multicolor printing refers to the formation of an image (a composite image), which can be, for example, graphic, type, or mixture of type and graphic, from a sequence of component images. Each component image can also be graphic and/or type and each component image can be a different color, the same color, a different hue, or a different value of a color. Each component image can be formed for example from lines, dots, solid colored areas, varying color density areas, or mixtures.

Generally, as is the practice in the flat sheet printing arts, each composite image in multicolor printing corresponds to one "color". However, in special design circumstances, a component image can itself be formed from more than one color. For example, a printing station can form a component image from a inkjet head that deposits two or more colors. Nevertheless, as used herein, "multicolor" refers to forming component images from at least two printing stations; the two color inkjet head example being considered as one printing station. Thus, printing three colors by forming two component images using two printing stations, one being a two color inkjet head station, is contemplated by this invention. However, it is preferred that each printing station be one color because such single color printing allows faster production rates than use of multiple-color printing heads.

Each component image is formed by a process referred to as printing. Production of printed edible pieces in a typical high speed mass production process can be described schematically by a sequence of processes. The edible pieces may be first formed by processes known in the art or by processes not yet developed. Then the pieces are dispersed, generally according to a conveniently designed plan, in order to present each piece to the printing processes. In particular, the pieces are dispersed onto a transporting surface that carries the pieces as they receive the component images. Each component image is formed, at a printing position, as the pieces pass through a printing station.

Figure 6:
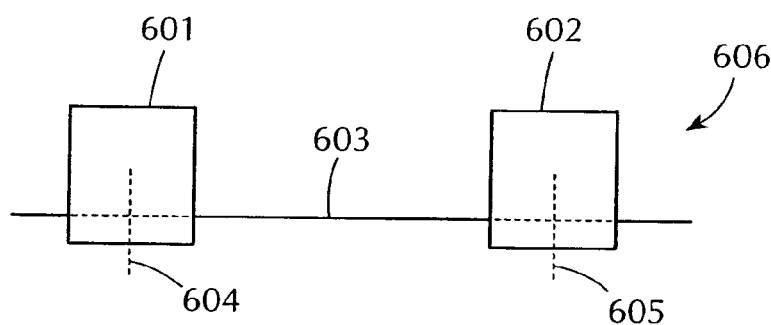
FIG. 6 is a schematic diagram of an embodiment of this invention having two printing stations.

Referring to FIG. 6, an apparatus 606 of this invention is shown schematically. A first printing station 601 and a second printing station 602 are shown. A transporting surface 603 is shown for moving edible pieces (not shown) from first printing station 601 to second printing station 602. First printing station 601 prints a first component image on the edible pieces at a first printing position 604, while second printing station 602 prints a second component image on the edible pieces at a second printing position 605. Transporting surface 603 maintains a registering relationship of the first component image and the second component image. It is apparent that other printing stations can be conveniently added to provide for more component images (more "colors"). Further, it is apparent that the edible pieces must be maintained in registration from first printing position 604 to second printing position 605, although this registration may be maintained from any point prior to first printing position 604 and subsequent to second printing position 605, as desired.

Preferably, the first component image dries prior to printing the second component image. Drying time and drying conditions may be altered to suit the requirements of different printing methods or images. Methods of altering the drying time or drying conditions include, without limitation: changing the speed of the conveying apparatus; changing the volume of air (or other gases) to which the pieces are exposed during drying; changing the condition of the air to which the pieces are exposed during drying (for example, its relative humidity and temperature); and changing the distance between printing stations.

Although the invention is described by at least two printing stations and a transport surface effective to maintain the registration of the images formed at each printing station respectively to each other, this invention includes holding the transport surface stationary after having the edible pieces distributed on it while the printing stations are moved to print the component images. Thus, the transporting surface can be, for example, a batch processing surface having receiving recesses of this invention for the edible pieces. After loading the recesses with the edible pieces, the printing stations are brought to sequentially print the component images on the edible pieces. In addition, both the transport surface and the printing stations may be moveable so long as a registered relationship is maintained from the first printing position to the second printing position.

An aspect of this invention is that the pieces maintain a fixed orientation with the transporting surface from one printing station to another printing station in order to maintain registration of each component image. With the pieces maintaining an orientation with the transporting surface, the registration would depend on the precision of the transporting surface, which is more easily controlled than the movement of a multitude of pieces.

Registration of a composite image formed from at least a first component image and a second component image is generally measured as the distance the first component image is off from its designed placement in the composite image relative to the second component image. It is preferable that the registration be maintained at better than $\frac{1}{64}"$ (0.40 mm), more preferably better than $\frac{10}{1000}"$ (0.25 mm), most preferably better than $\frac{2}{1000}"$ (0.05 mm). By better than $\frac{1}{64}"$ (0.40 mm), it is meant that one component image is within $\frac{1}{64}$ (0.40 mm) of an inch from its designed placement on the edible piece relative to another component image. In the case of a skew error, the distance is measured at the maximum displacement from the designed placement. A determination of registration error requires printing of at least two component images and measuring the maximum displaced distance of one component image relative to another component image.

It is apparent that the amount of registration error that is acceptable depends on the design and on the size of the edible piece. The registration must be maintained to a higher standard to form, for example, a two color whimsical face on Mini M&M's® Chocolate Candies pieces, which are about 9.3 mm in diameter, than to form a proportionately larger two color whimsical face on M&M's® Peanut Candies pieces, which are about 14.4 mm in their smallest dimension. It will be obvious to persons skilled in the art that smaller or larger size shaped edible pieces may be used as desired.

Figure 13:
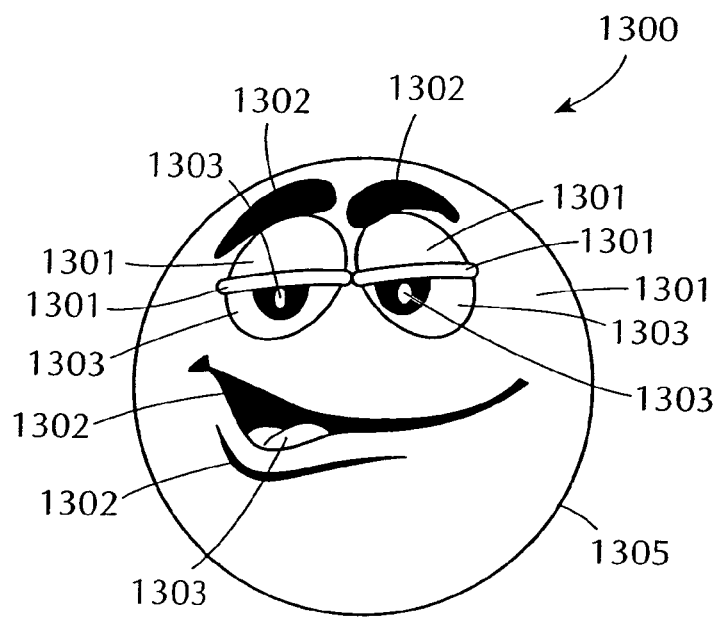
FIG. 13 is a schematic view of an embodiment of this invention.

Referring to FIG. 13, an example of a composite image 1300 is shown formed on a lentil confectionery piece 1305. Composite image 1300 is composed of a first component image 1302 and a second component image 1303 printed on a background 1301. In this example, component image 1302 is a black image while second component image 1303 is a white image.

Figure 14:
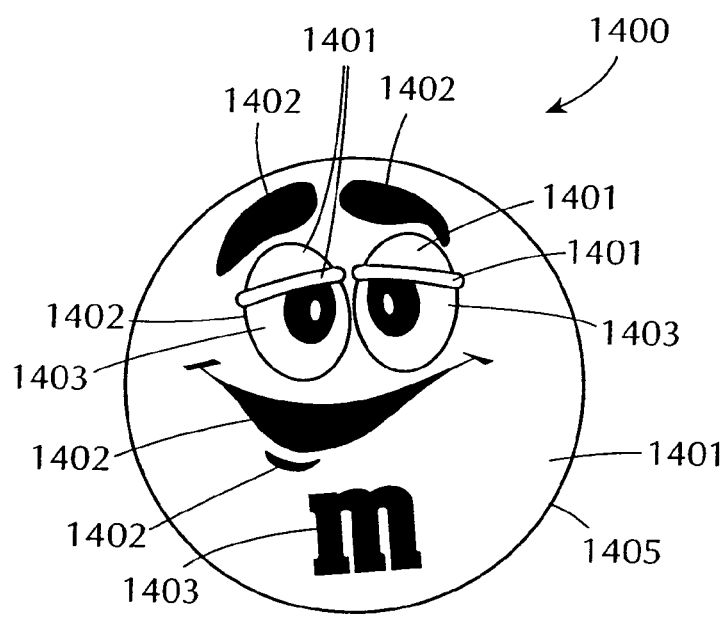
FIG. 14 is a schematic view of an embodiment of this invention.

Referring to FIG. 14, a composite image 1400 is shown formed on a lentil confectionery piece 1405. Composite image 1400 is composed of a component image 1402 and a second component image 1403 printed on a background 1401. In this example, component image 1402 is a black image while second component image 1403 is a white image.

Figure 15:
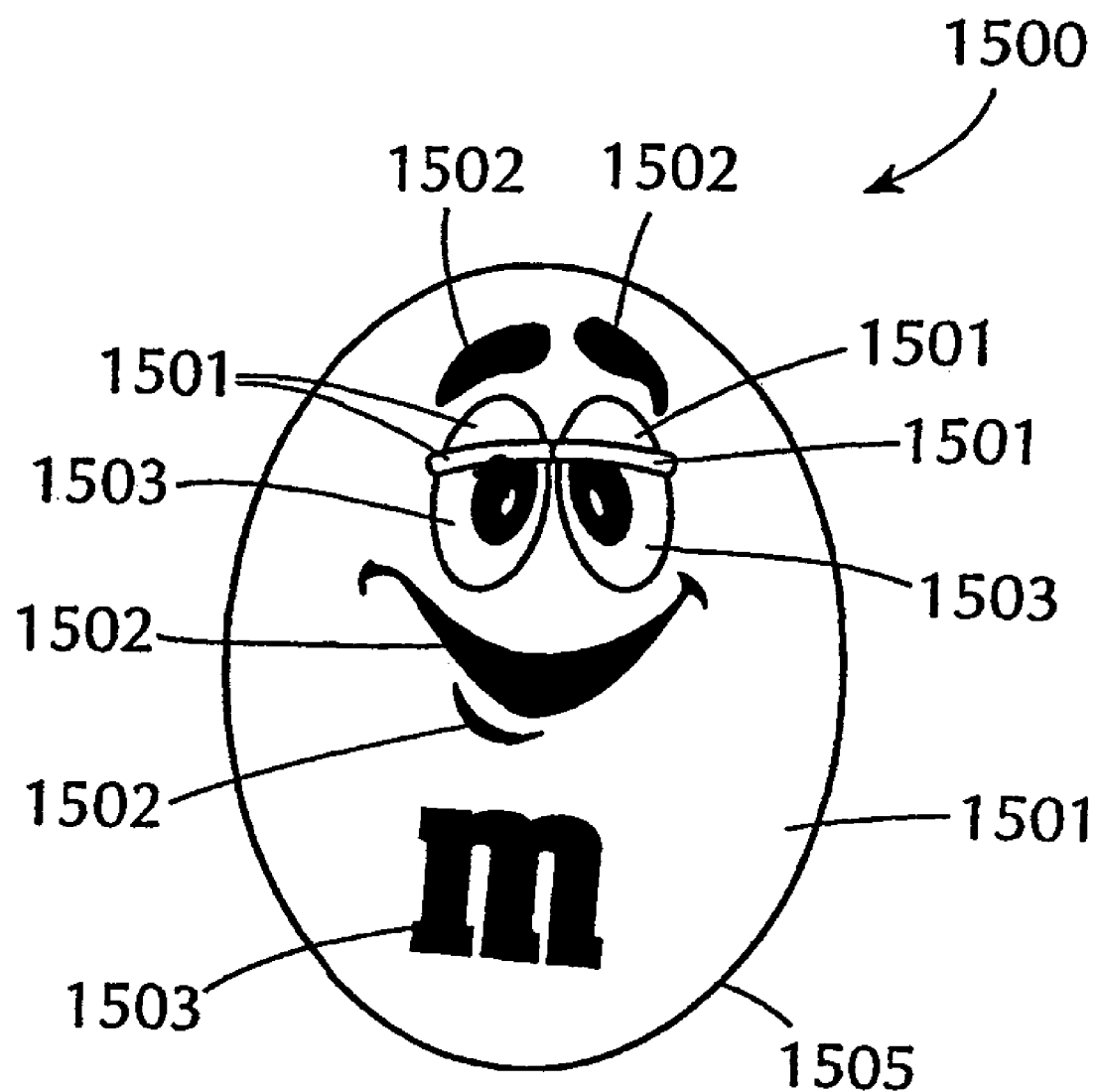
FIG. 15 is a schematic view of an embodiment of this invention.

Referring to FIG. 15, a composite image 1500 is shown formed on a lentil confectionery piece 1505. Composite image 1500 is composed of a component image 1502 and a second component image 1503 printed on a background 1501. In this example, component image 1502 is a black image while second component image 1503 is a white image.

It is apparent that the colors of the above component images are determined by the edible ink that is used. It is well known in the art which inks can be utilized to effect the desired properties of, for example, color, hue, intensity, and opacity.

One embodiment of this invention maintains the orientation of the edible pieces with the transporting surface by providing recesses adapted to receive the edible pieces and firmly maintaining the pieces in the recess by applying a reduced pressure in an opening in the recess. Thus, the pieces are firmly secured in the recesses by a vacuum or reduced pressure applied to the pieces.

Another embodiment of this invention maintains the orientation of the edible pieces with the transporting surface by providing recesses, having resilient portions, adapted to receive the edible pieces and firmly maintaining the pieces in the recess by applying a reduced pressure in an opening in the recess. The resilient portions conform to the edible piece contour. Thus, the pieces are firmly secured in the recesses by a vacuum or reduced pressure applied to the pieces.

The printing of each component image can be by any convenient printing process such as, for example, offset printing, flexographic printing, inkjet printing, or stamp pad printing. Stamp pad printing offers a higher definition than the other printing methods but at much reduced production rates. Offset and flexographic printing are preferred because of their lower costs and higher production rates. However, as described below, inkjet printing is preferred for pieces with softer or rougher surfaces.

The edible pieces used in the method of this invention can be any convenient edible shaped article such as, for example, candies, nuts, cookies, vitamin tablets, pharmaceutical tablets, capsules, caplets, panned confectioneries, pressed confectioneries, confectionery lentil pieces, rice, beans, pasta, pet food nuggets, pet food biscuits, ice cream, and the like. Preferably the edible pieces have a non-planar surface upon which the composite image is printed.

The methods of this invention allow for the printing of registered composite images onto edible pieces at high production rates. It is preferred that the production rate be at least 200,000 edible pieces per hour, more preferably 400,000 edible pieces per hour, and even more preferably 500,000 edible pieces per hour. The production rates above are expressed in terms of total output. The production rate may also be expressed in terms of pieces per hour per lane, in a multi-lane machine. In a preferred embodiment, the production rate is preferably at least 1,000 pieces per hour per lane, more preferably greater than 10,000 pieces per hour per lane, and most preferably greater than 50,000 pieces per hour per lane.

In an offset printing process, the image is first formed as an engraved negative image on an etched roll. The etched roll is inked effective to transfer an ink positive image to a rubber roll. The ink image is then transferred to the receiving surface by firmly contacting the ink image to the receiving surface. When using an offset printing process, the receiving surface of each edible piece should be sufficiently firm (readily determined by one in the art) to accept the printing rubber roll without damage. Thus, for edible pieces having a soft or crumbling surface—such as, for example, cookies, baked goods, or chocolate nuggets—it is preferred that a hard shell such as a candy shell encase the piece. Other edible pieces are manufactured in a very firm state and thus can be printed by offset printing without a coating. Such edible pieces include, for example, dry pasta, raw dry rice, dry beans, and pharmaceutical capsules, caplets and tablets. Ice creams are often made with a frozen coating sufficiently firm to act as a receiving surface for offset printing.

In a stamp printing process, images are formed as a raised surface on a stamping pad. Ink is applied to the raised surface and the image is transferred to the receiving surface by firmly pressing the raised surface against the receiving surface. In this process, the receiving surface generally needs to be more firm, readily determined by one in the art, than that firmness required for offset printing.

In the pad printing process, similar to offset printing process, ink is applied to a negative etched image. The inked image is transferred in positive image form to a resilient surface print pad that prints onto a receiving surface.

In an inkjet printing process, ink is applied as a stream of ink particles or aerosols directly on to a receiving surface. Thus, an image can be formed on soft or crumbling surfaces because no contact is made other than by the jet of ink.

Nevertheless, in utilizing a vacuum or a pressure differential to maintain the position of an edible piece with respect to the transporting surface, the edible piece should be of sufficiently low porosity, readily determined by one in the art, to respond to the applied pressure differential to firmly press, set or fix the edible piece against the transporting surface.

Figure 1:
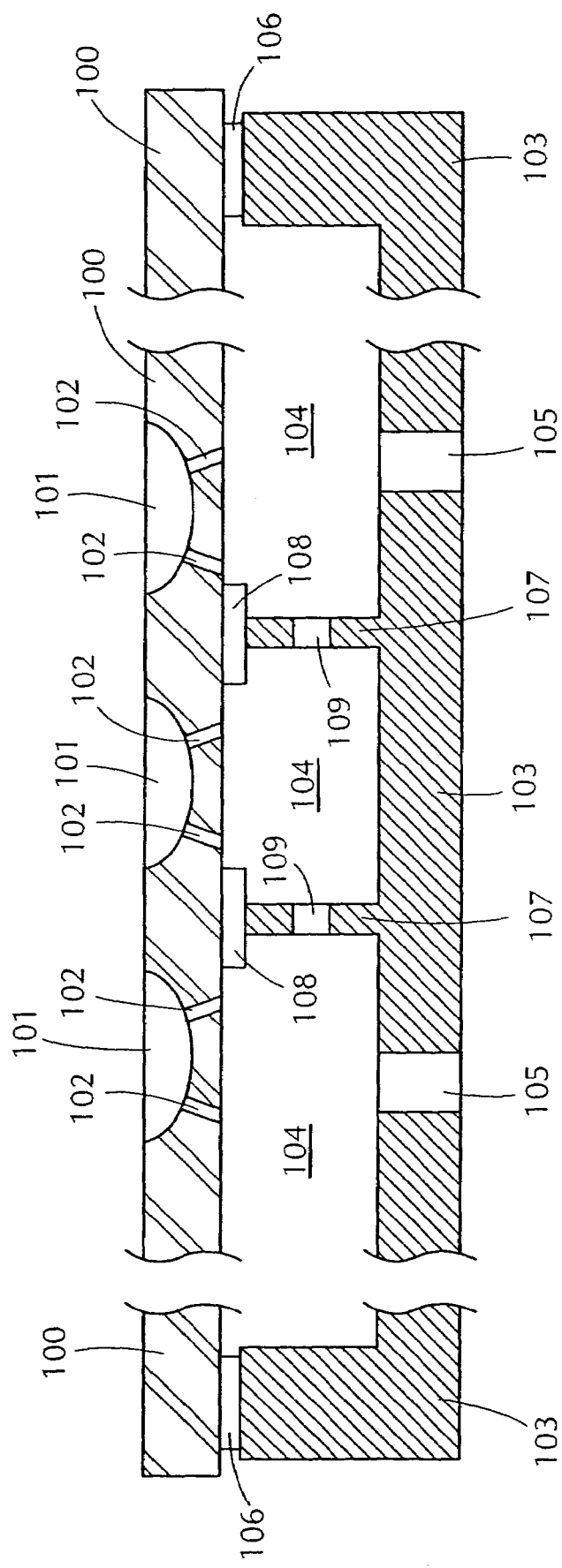
FIG. 1 is a schematic cross-sectional view of an embodiment of this invention.

Referring to FIG. 1, a conveying substrate 100 is shown in cross-section transverse to the direction of conveyance. Substrate 100 is supported on base 103. Substrate 100 includes a plurality of recesses 101 adapted to accept edible pieces (not shown). Recess 101 includes at least one opening 102 providing communication with at least one chamber 104. Chamber 104 contains reduced pressure supplied by a vacuum pump (not shown) through at least one vacuum access opening 105.

Substrate 100, ie. the transporting surface, can be composed of any convenient suitable material such as, for example, metal, polymer, plastic, composite, or ceramic. Substrate 100 can be any convenient shape such as, for example, an endless belt, a disk, a ring, or a pin bed. Substrate 100 can be formed from a plurality of convenient elements such as, for example, flat bars, or scalloped edged flat plates. Further, each element can include one or more recess portions. For example, a moving substrate is described in U.S. Pat. No. 5,433,146, incorporated herein by reference.

A seal (not shown) may be between elements to assist in maintaining the reduced pressure in chamber 104. Such seals can be formed, for example, by machining the elements to close mating tolerances, by positioning gasket material between the elements, by positioning sealing material to bridge the gap between the elements, e.g., see FIG. 7, and by disposing a suitable liquid, semi-liquid, or elastomeric material between the elements.

Substrate 100 can be moved by any convenient method (not shown) well known in the art such as, for example, by stepping motors, continuous motors, or servo controllers acting on the substrate directly or through any of gears, pulleys, chains, or sprockets; including as shown in U.S. Pat. No. 5,433,146. Generally, the movement of the substrate is coordinated with the printing stations. Such coordination (not shown) can be achieved utilizing any convenient method such as, for example, through any of gears, pulleys, chains or sprockets. Such coordination is described for example, in U.S. Pat. No. 5,433,146.

Base 103 can be composed of any convenient material such as, for example, metal, polymer, composite, or ceramic. Base 103 can be of any convenient shape and can include one or more supports 107, or plenum dividers, to assist in maintaining the shape of substrate 100 against the pressure differential across the substrate. Supports 107 can optionally include one or more slide elements 108 to facilitate movement of substrate 100 relative to base 103. Slide element 108 can conveniently be a slippery polymer such as a polyfluorinated polymer or a nylon. Slide element can also be any convenient mechanical element such as, for example, roller bearing, ball bearing, oiled bronze runner, or smooth metal. Supports 107 can optionally include one or more openings 109 to facilitate distribution of reduced pressure through chamber 104.

Optional seal 106 assists in maintaining a reduced pressure in chamber 104. It is preferable to include seal 106 to minimize pump capacity requirements. Seal 106 can be any convenient seal such as, for example, a nylon portion, an interlocking geometry, and the like. Seal 106 also serves as a sliding element.

Figure 3:
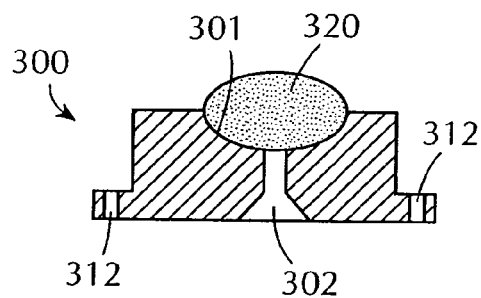
FIG. 3 is a cross-sectional view of an embodiment of this invention.
Figure 4:
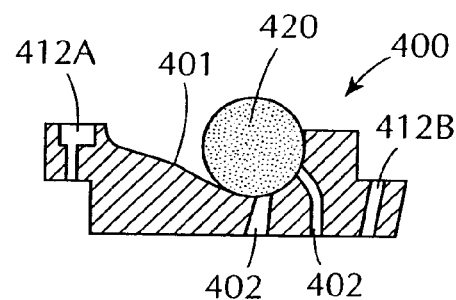
FIG. 4 is a cross-sectional view of an embodiment of this invention.
Figure 5:
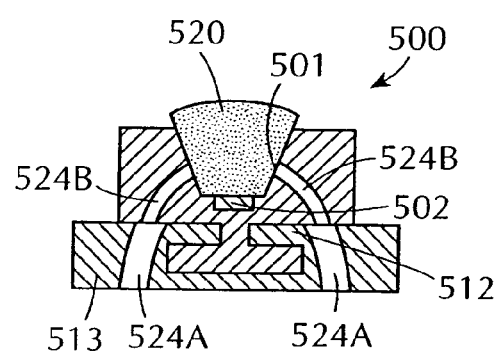
FIG. 5 is a cross-sectional view of an embodiment of this invention.

Recess 101 can be any convenient shape effective to accept a convenient piece substantially in a consistent orientation. Such shapes can conveniently be in correspondence with the shape of the edible piece to be accepted. The recesses may also be shaped so that edible pieces may be positioned laterally, longitudinally and rotationally within the recesses in a predetermined position, and also aid in preventing skewing and yawing of the edible pieces. However, recess 101 can have a shape substantially different from the shape of the edible piece to be accepted in order to facilitate the receiving of the edible pieces from the input feeding station onto the substrate. Such shapes are described, for example, in U.S. Pat. Nos. 5,433,146, 5,768, 996, 5,836,243, and 5,655,453, each incorporated by reference herein. Other examples of recesses are shown in FIGS. 3, 4, and 5.

The recesses utilized in this invention preferably allow the surface of the edible piece, and particularly a non-planar surface of the edible piece, to be above the surface proximate to the recess—that is, the printing should be performed "proud" as opposed to printing in "relief". Thus, the depth of the recess should be less than the thickness of the edible piece, measured from the printing surface of the piece, in order to allow the surface to protrude and be proud in relation to the surface proximate to the recess. Such proud printing advantageously presents more of the non-planar surface of the piece to the printing process. Thus, a larger portion of the non-planar surface of an edible piece can be printed as compared to relief printing where the non-planar surface, or a portion thereof, of the edible piece is below the surface proximate to the recess.

The vacuum or pressure differential can be provided by any convenient method such as, for example, by utilizing a vacuum pump, and a transverse airflow across the vacuum holes (the Bernoulli effect).

Figure 16:
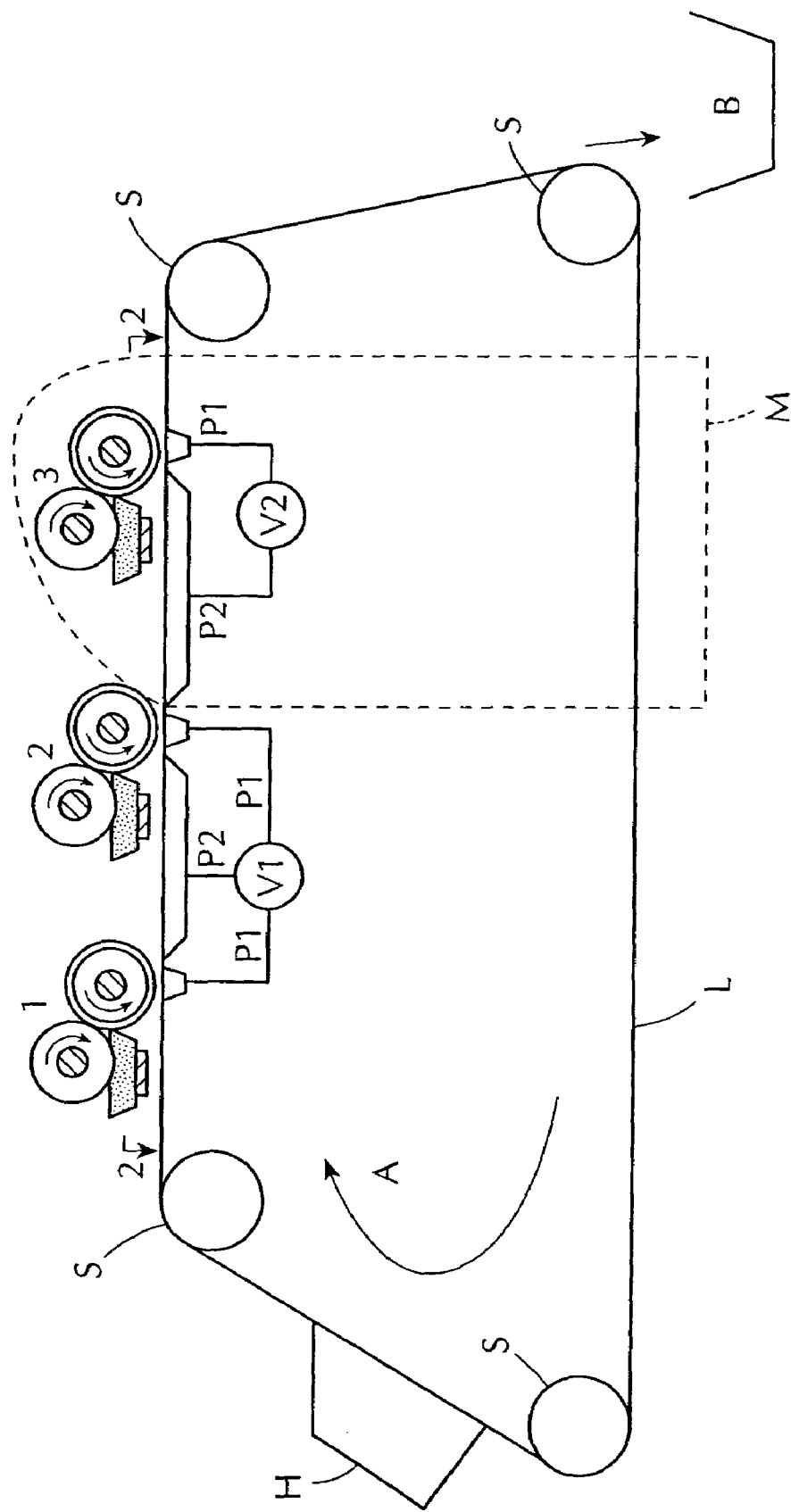
FIG. 16 is a schematic side view of an embodiment of this invention.

FIG. 16 is an exemplary illustration of an overall conveying system that includes an endless loop L comprising, for example, a plurality of carrier bars attached to a chain that is entrained about a series of sprockets S. A hopper H contains a plurality of shaped edible pieces that are received within transporting recesses formed in each of the carrier bars as the loop L travels along a clockwise direction indicated by arrow A. The upper run of the loop L includes three printing units 1–3 that print registered images on the pieces as they pass below. After printing, the edible pieces are dropped into a bin B.

The printing unit 3 may be formed as part of a module M that can be readily removed from the loop L by shortening the chain and removing a set number of carrier bars. Conversely, additional modules M can be added by lengthening the chain and adding carrier bars.

In a preferred embodiment of this invention, a first vacuum pump V1 controls the pressure at and between each of the printing units 1–3. A plenum system is provided below the printing stations 1–3. A vacuum pressure P1 is applied to first and second portions of the plenum immediately below the first and second printing units 1, respectively. Preferably, the pressure P1 is higher than vacuum pressure P2 applied to a third portion of the plenum system between the first and second printing units 1 and 2. A valve system can be used to create different pressures using a single vacuum pump. The vacuum pressure P1 is higher than the vacuum pressure P2 because the edible pieces tend to adhere to the printing roll of the printing units 1 and 2. For example, the vacuum pump V1 can be a 6–8 hp motor having a capacity of 300–400 cfm, depending on the type of piece being conveyed. The vacuum pump V2 can form a part of the module M and may be a 5.5 hp motor having a capacity of 240 cfm, depending on the type of piece conveyed. The vacuum pump V2 may be smaller than the vacuum pump V1 because the vacuum pump V1 supplies vacuum pressure below printing units 1 and 2 as well as between those units, whereas the vacuum pump V2 supplies vacuum pressure only to the third printing unit 3 as well as between printing units 2 and 3.

Figure 17:
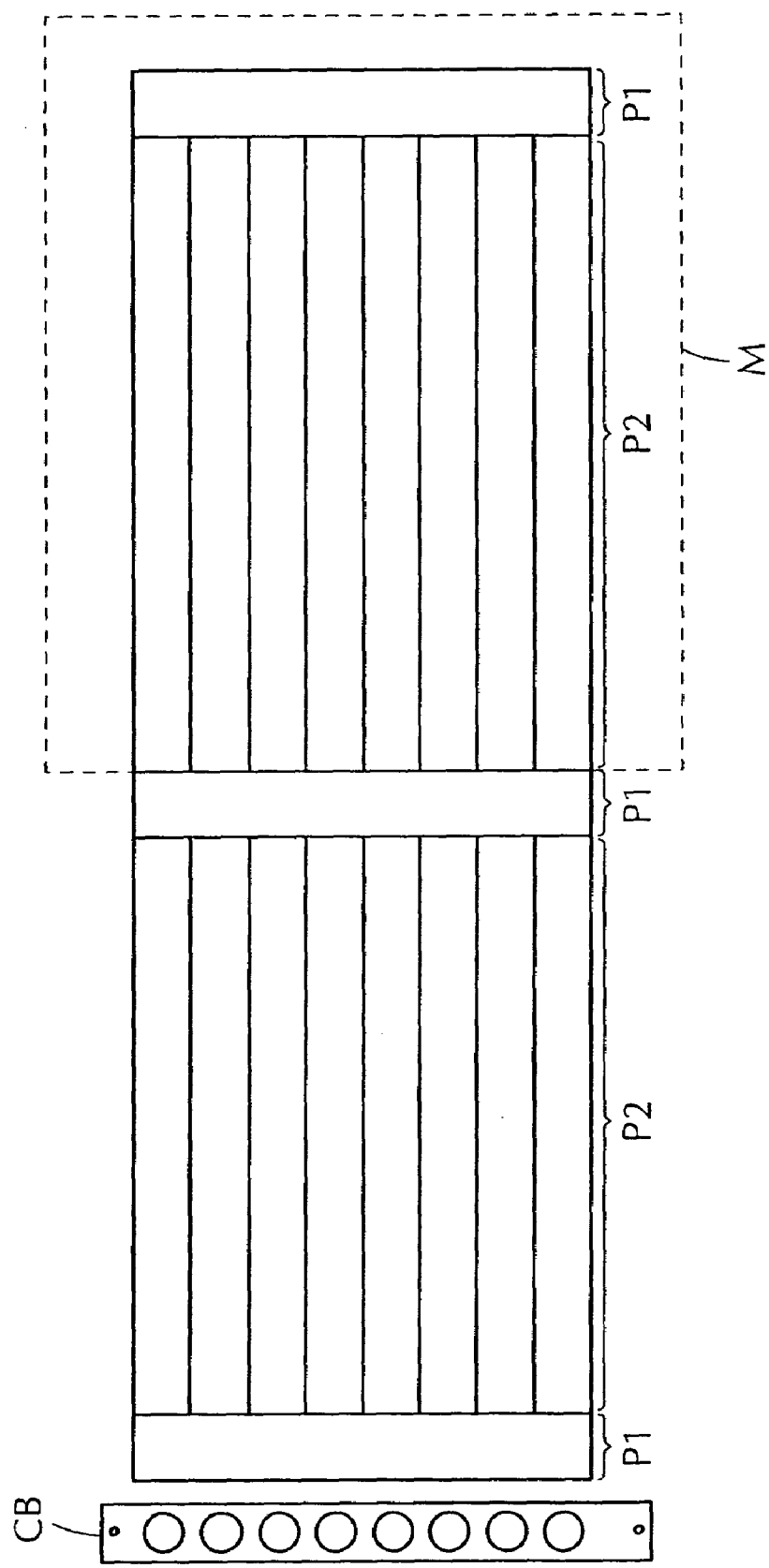
FIG. 17 is a schematic top view of the embodiment of this invention illustrated in FIG. 16.

FIG. 17 shows an exemplary plan view of the vacuum system, along with a carrier bar CB shown alongside. Each plenum positioned below the printing roll of each printing unit is subject to vacuum pressure P1 and has a width approximately equal to or less than a width of the carrier bar CB. The plenums associated with the printing rolls extend transverse to the traveling direction of the loop L, columnwise in FIG. 17. By contrast, in a preferred embodiment, a plurality of sub-plenums are positioned between the printing units, which are subject to vacuum pressure P2, and extend along the traveling direction of the loop L, row-wise in FIG. 17. Preferably, a row is provided for each recess R within the carrier bar CB. As shown in FIG. 1, adjacent row oriented plenums may communicate with one another via holes 109 in the supports 107.

In FIG. 16, printing is performed on only one side of the edible articles. However, printing on both sides of the edible pieces is also within the scope of the present invention. For example, Ackley's U.S. Pat. No. 5,878,658, incorporated by reference, discloses a ramp feeder including a two-sided printer for tablets and capsules that may be used with the ramp feeder shown in FIG. 16.

In particular applications, where a pressurized processing step may be required between applications of images, the pressure differential can conveniently be provided by the difference between the raised pressure and atmospheric (or lower) pressure. Nevertheless, it is preferable to supply reduced pressure to assure that the pieces are firmly secured to the recesses.

As described above, the action of the vacuum or pressure on the edible pieces is formed by positioning the edible piece between a volume of higher pressure and a volume of lower pressure effective to firmly urge the edible piece against a transporting surface. This pressure differential is formed by any convenient method such as, for example, providing at least one opening in a transporting surface effective to provide access from a volume of higher pressure to a volume of lower pressure. By positioning an edible piece over at least one such opening, the force arising from the pressure differential is applied to the edible piece, urging the piece in the recess against the transporting surface.

Printing processes that utilize contact of a printing surface to the receiving surface subject the receiving surface to a force that tends to urge the receiving surface towards the printing surface as the printing surface moves away from the receiving surface after printing. Such urging is caused by the ink that is momentarily between the receiving surface and the printing surface, and by the resilience of the printing surface. The ink acts as a bonding medium between the two surfaces to urge the receiving surface towards the printing surface; the rebound of the resilient printing surface is transferred to the printing surface to urge the receiving surface in the same direction as the rebounding printing surface.

Therefore, less force is needed to maintain the position of the edible piece while the edible piece is between printing stations than during the printing operations at the printing stations. Thus, one example of this invention provides added vacuum at the printing stations 601 and 602, particularly at printing positions 604 and 605, to minimize the reduced-pressure supply requirements. That is, less reduced-pressure is applied to the edible pieces when the pieces are not at the printing positions. Such pressure allocation can be by any convenient method well known to one in the art such as, for example, by ducting, by baffles, by added pumps, or by volume differentiation.

The recesses can also be formed in detachable elements that can be fixed to a transport surface. Referring to FIG. 3, an element 300 has a recess 301 adapted to accept an edible piece 320. At least one opening 302 provides communication to reduced pressure provided by corresponding openings on a transport surface (not shown). The element can be mounted to the transport surface by any convenient method such as, for example, bolts, screws, clamps, or adhesives.

In one example, element 300 is shown in cross-section transverse to the longitudinal direction of transporting the pieces to the printer. In this example, element 300 is preferably substantially long in the direction into the paper and can be described as a slat or bar. Element 300, when formed as a slat, preferably contains a multitude of recesses 301. The slat can be mounted or removed by a quick release mechanism as described in U.S. Pat. No. 5,630,499, incorporated herein by reference. FIG. 3 shows optional mounting holes 312 through which element 300 can be selectively attached and detached to corresponding threaded holes in the transport surface.

Element 300 can also, in another example, be described by FIG. 3 as a cross-section taken in the longitudinal direction of transport. In this case, a multitude of elements 300 are preferably mounted in a row across the transverse direction.

Referring to FIG. 4, an element 400 shown in cross-section transverse to the longitudinal direction of travel, has a recess 401 adapted to accept an edible piece 420. At least one opening 402 provides communication to reduced pressure provided by corresponding openings on a transport surface (not shown). Optional mounting holes 412A and 412B allow mounting of element 400 to the transport surface. In this case, element 400 is formed to allow mounting hole 412A of one element 400 to overlap mounting hole 412B of another element 400' (not shown), thereby presenting a substantially contiguous surface having a regular distribution of recesses 401 for situations where it is desirable to present a planar array of edible pieces, such as in batch processes where the printing stations are moved in relation to the array of pieces.

In situations such as, for example, an endless belt, the overlapping geometry of the left and right sides of element 400 can provide a seal to minimize vacuum pump requirements.

Recesses 401 are adapted to facilitate loading of pieces 420. Pieces can be dropped from a hopper and urged to the proper position relative to the recesses. Methods to distribute pieces to a consistent position in an array are described in U.S. Pat. Nos. 5,433,146, 5,768,996, 5,863,243, 5,655, 453, and 5,630,499. Such urging can be also include any convenient method such as by vibrating, brushing, or by the action of a designed geometry of the hopper and the receiving transport surface. After piece 420 is in the proper position, vacuum is applied to firmly secure piece 420 to element 400.

Figure 7:
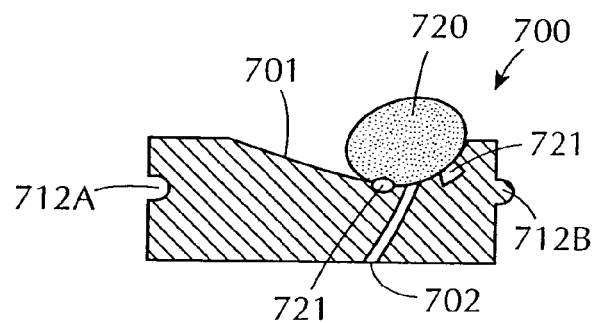
FIG. 7 is a cross-sectional view of an embodiment of this invention.

Referring to FIG. 7, an element 700 shown in cross-section transverse to the longitudinal direction of travel, has a recess 701 adapted to accept an edible piece 720. At least one opening 702 provides communication to reduced pressure provided by corresponding openings on a transport surface (not shown). A tongue 712B mates with a groove 712A to provide vacuum seals between a multitude of elements 700 to be arrayed on a transport surface. Elements 700 can be affixed to transport surface by magnetic attraction by applying a magnetic field to the transport surface with a magnetic coil (not shown). Recess 701 has resilient portions 721, or O-rings, that assist in maintaining edible piece 720 in position. Resilient portions 721 conform to the contour of edible piece 720 and assist in maintaining the reduced pressure applied to edible piece 720.

It is preferable that the openings that provide communication to reduced pressure be positioned to urge the piece into the proper position relative to the recess.

Recesses having resilient portions can also be formed directly on the transport surfaces. As described above, such resilient portions can be formed from rubber, urethane, teflon, nylon, and the like.

Figure 2:
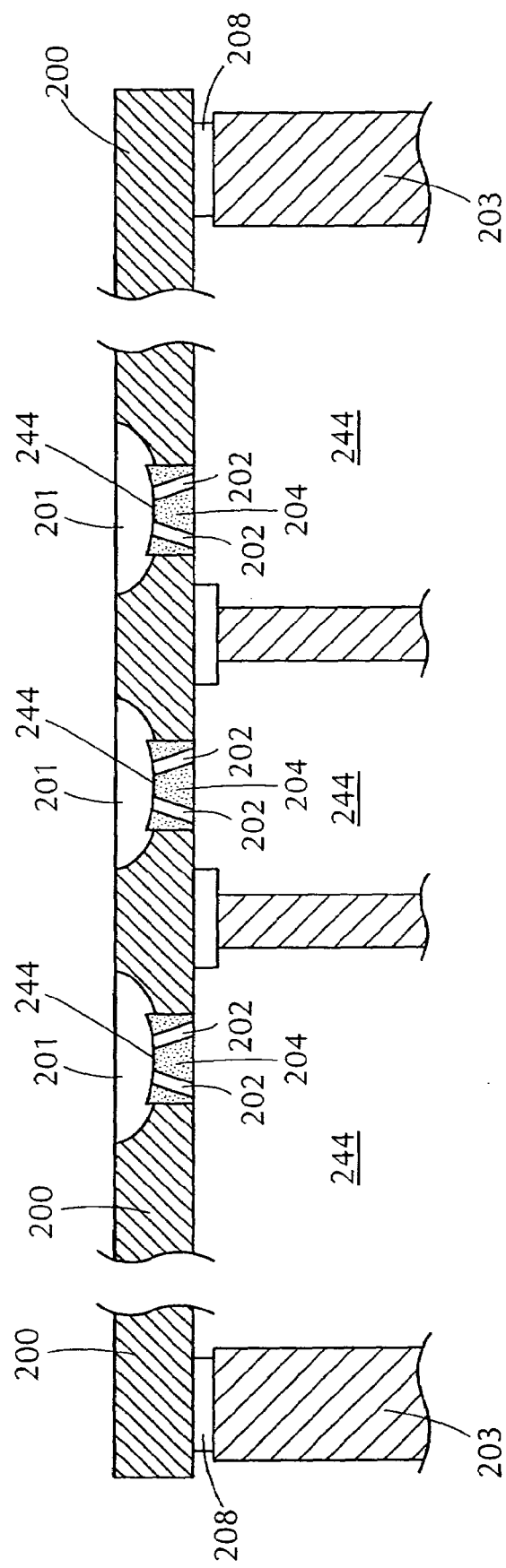
FIG. 2 is a schematic cross-sectional view of an embodiment of this invention.

In another embodiment, the edible piece is positioned in a recess that includes a surface portion formed from a resilient material. Referring to FIG. 2, a conveying substrate 200 is shown in cross-section transverse to the direction of conveyance. Substrate 200 is supported by supports 203. Similar to that of FIG. 1, supports 203 can optionally include slide elements 208. Substrate 200 includes a plurality of recesses 201 adapted to accept edible pieces (not shown). Recess 201 includes at least one resilient portion 244 formed from a resilient material. Recess 201 also includes at least one opening 202 that provides communication to a reduced pressure. In this example, a volume 224 provides reduced pressure to opening 202. Volume 224 has a reduced pressure that can be provided from any convenient source (not shown) such as, for example, a rotary vacuum pump and a reciprocal vacuum pump.

Resilient portion 244 can be formed by any convenient method such as, for example, coating a surface portion of recess 201 with a resilient layer. The resilient layer can be conveniently formed from, for example, rubber, silicone, elastomer, and the like. Resilient portion 244 can also be formed by one or more inserts 204 made from a the same or similar resilient materials as recited above.

As with recess 101 discussed previously, recess 201 can be any convenient shape effective to accept a convenient piece substantially in a consistent orientation.

Referring to FIG. 5, an element 500 includes a recess 501 adapted to receive an edible piece 520. A resilient portion 502 forms a resilient surface portion of recess 501. A mounting flange 512 allows a multitude of elements to be mounted on a transport surface 513 provided with corresponding mounting flange receiving grooves. The elements can be fixed to the receiving grooves by set screws or tangs (not shown). At least one opening 524B on element 500 communicates with at least one opening 524A on transport surface 513. Reduced pressure is supplied through openings 524A and 524B to firmly maintain the position of edible piece 520 in relation to element 500.

Figure 10:
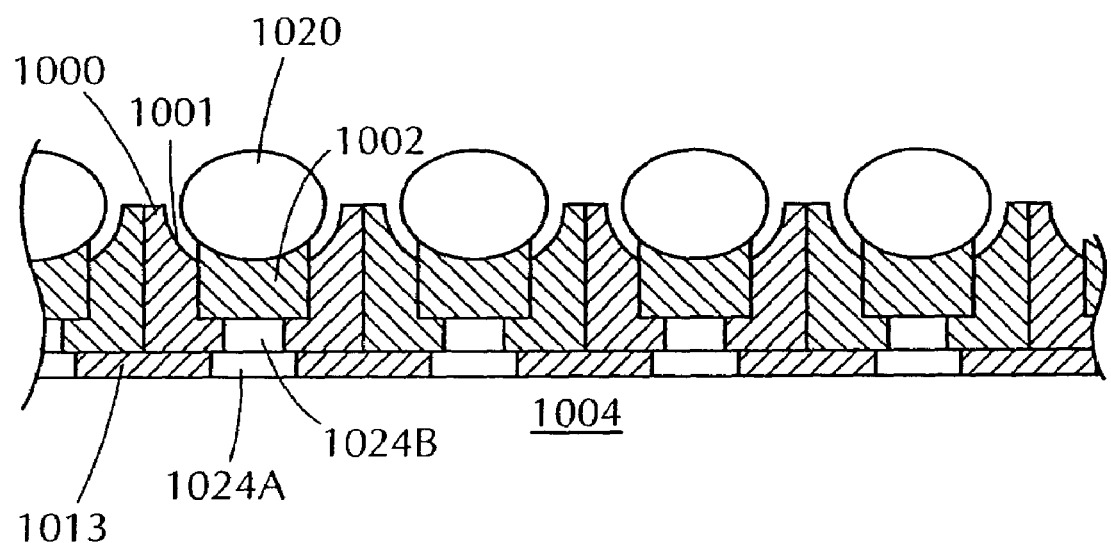
FIG. 10 is a schematic cross-sectional view of an embodiment of this invention.

In another example, referring to FIG. 10, a plurality of slat elements 1000 are shown in cross-section transverse to the longitudinal direction of transport. Slat element 1000 has a recess 1001 adapted to receive edible piece 1020. Recess 1001 includes a porous resilient portion 1002. Recess 1024B in communication with opening 1024A in transport surface 1013 allows a reduced pressure in volume 1004 to be applied to edible piece 1020 through porous resilient portion 1002 to maintain a position of edible piece 1020 to element 1000.

As described above, the non-planar surface of the edible piece can be positioned above the transporting surface. In one embodiment, the piece is raised prior to printing. Referring to FIG. 11A, an element shown, in this example transverse to the direction of transport, includes a recess 1101 adapted to receive an edible piece 1120. Recess 1101 includes at least one opening adapted to embrace sleeve 1122. Sleeve 1122 includes at least one opening 1124 to allow reduced pressure from a volume 1104 to be applied to edible piece 1120. Sleeve 1122 moves in response to contour or cam surface 1130.

As shown in FIG. 11B, contour surface 1130 can urge sleeve 1122 upwards to raise edible piece 1120 from the surface of element 1100. Sleeve 1122 should be prevented from pivoting by, for example, shaping the sleeve and receiving opening appropriately with corners, or flanges (not shown). Optionally, guides, rollers, and slides can be provided between sleeve 1122 and contour surface 1130.

In another example, the sleeve is lowered to provide access to the non-planar surface above the transport surface. Referring to FIG. 12, a multitude of elements 1200 are shown in cross-section in the longitudinal direction of transport (the pieces are moved from left to right). Element 1200 includes a recess 1201 adapted to receive an edible piece 1220. Recess 1201 includes at least one opening adapted to receive a sleeve 1222. Sleeve 1222 includes at least one opening 1224 that provides communication to a reduced pressure in a volume 1204. The reduced pressure applied to edible piece 1220 maintains a position of edible piece 1220 to element 1200. The action of a contour surface 1230 is shown causing sleeve 1222 to lower as the contour surface moves away from the element 1200. A seal 1206 assists in maintaining a pressure differential across the edible piece and minimizes the capacity requirements for the source of reduced pressure (not shown).

Figure 8A:
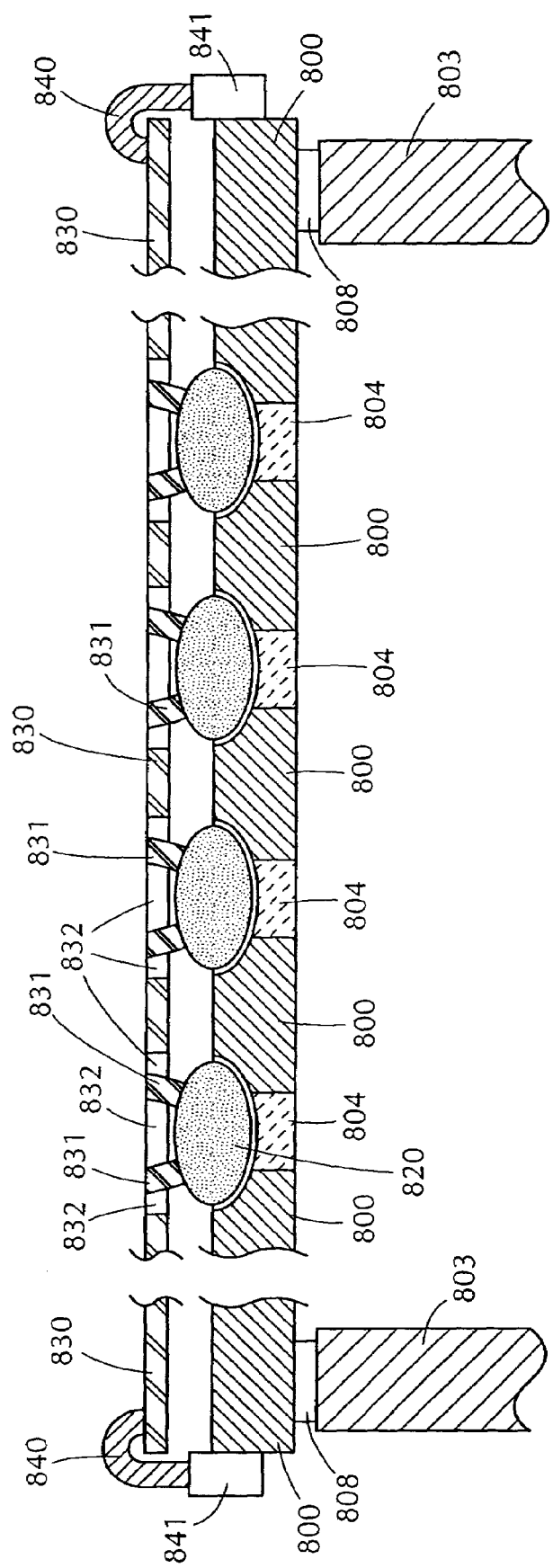
FIG. 8A is a schematic cross-sectional view of an embodiment of this invention.
Figure 8B:
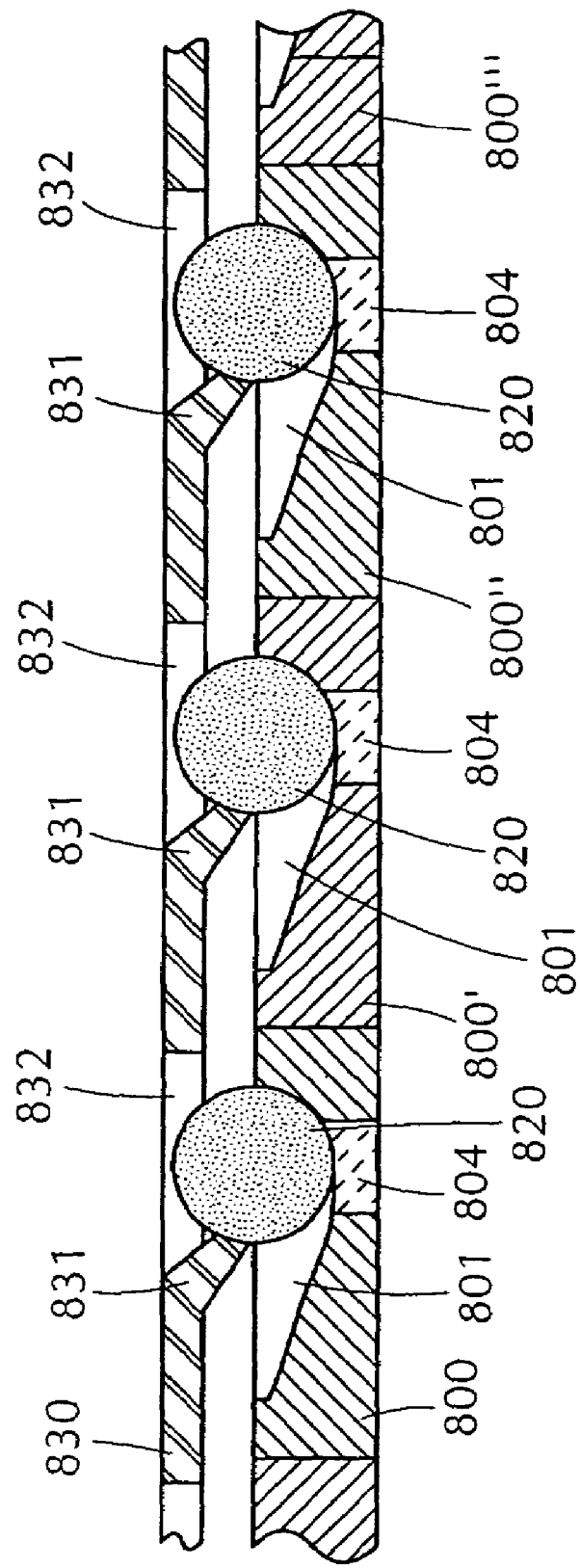
FIG. 8B is a schematic cross-sectional view of an embodiment of this invention.

In yet another embodiment, the edible piece is positioned in a recess and held in the recess mechanically by a retaining plate or retaining fingers. Referring to FIG. 8A, a conveying substrate 800 is shown in cross-section transverse to the direction of conveyance. FIG. 8B shows a plurality of substrates 800, 800', 800", and 800'". Substrates 800, 800', 800", and 800'" are interconnected by hinges (not shown) to form an endless belt. Substrate 800 is supported by supports 803. Similar to FIG. 1, supports 803 can optionally include slide elements 808. Substrate 800 includes a plurality of recesses 801 adapted to accept edible pieces 820. A retaining plate 830 includes a retaining member 831 that holds edible piece 820 against recess 801 in a fixed position. Retaining plate 830 includes at least an opening 832 to allow access to edible piece 820 by a printing station (not shown).

When retaining plate 830 is urged against edible pieces 820, edible pieces are firmly held in position in recess 801. The urging of plate 830 against edible pieces 820 can be by any convenient method such as, for example, by holddown fingers 840 connected to cam followers 841. As cam followers 841 ride over an appropriate contour (not shown) force is applied or released to the holddown fingers. Force is applied between printing positions effective to maintain registration of the applied component images. Other methods for urging plate 830 against edible pieces 820 can be, for example, utilizing electromagnetic actuators between the retaining plate and the transport surface, applying spring pressure between the retaining plate and a surface above (looking at FIGS. 8A and 8B) the retaining plate, and applying a spring pressure to pull retaining plate towards the transport surface, allowing the weight of the retaining plate to exert against the edible pieces.

Retaining plate 830 can be any convenient shape such as, for example, an open web, and an articulated series of plates. Retaining plate 830 can include any convenient number of retaining member 831. Retaining member 831 can be the inner circumferential contour of opening 832. Retaining member 831 can be formed from a separate material from retaining plate 830 or can be formed from a portion of retaining plate 830. Retaining member 831 can be a series of channels, guides, or placks situated to trap the edible pieces against the recesses.

Optionally, recess 801 includes at least one surface portion 804 that is resilient. Resilient portion 804 assists in maintaining the position of the edible piece in the recess by adapting to variations in the shape of the edible piece and minimizes damage to the edible piece by cushioning the edible piece in the recess.

Figure 9:
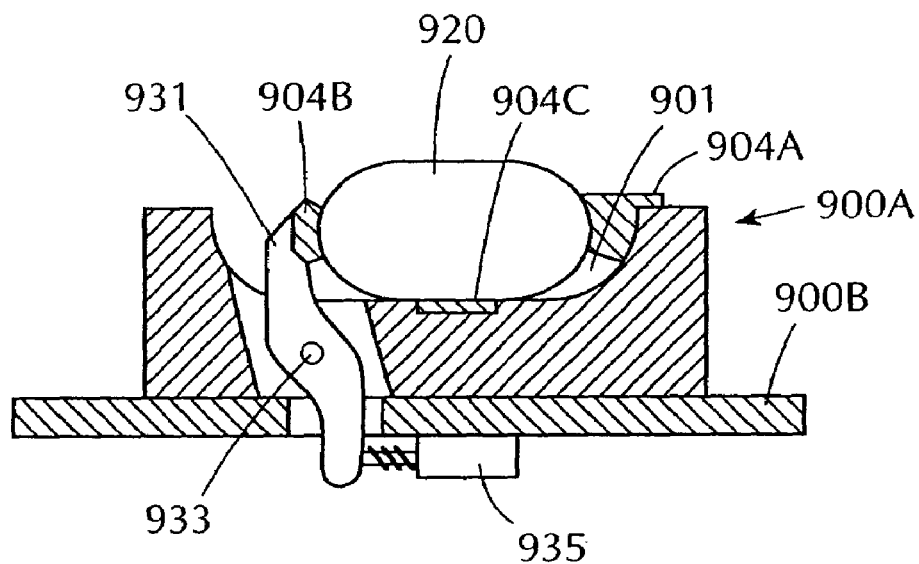
FIG. 9 is a cross-sectional view of an embodiment of this invention.

The edible pieces can also be held in position by retaining members without a retaining plate. Referring to FIG. 9, an element 900A is mounted to a transporting surface 900B. Element 900A includes a recess 901 adapted to receive an edible piece 920. A retaining member 931 pivots on a pivot 933 to hold edible piece 920 once edible piece is in position. Retaining member 931 is shown, in this example, pivoting in response to an actuator 935. Other convenient methods can be used to move the retaining member to trap the edible piece firmly in the transporting recess such as, for example, by electromagnetic actuators, and by a spring force responsive to a position sensor.

Optionally, recess 901 includes portions 904A and 904C that can be resilient, as described above for 804. Further, optionally, retaining member 931 can also include resilient portion 904B.

The transporting surface can be held stationary in each of the above examples while the printing stations are moved to print the component images sequentially. Further, the printing stations and the transporting surfaces can be all moved relative to each other and/or relative to the earth so long as the registered relationship of the piece is maintained.

Other variations and modifications of this invention will be apparent to those skilled in this art after careful study of this application. This invention is not to be limited except as set forth in the following claims.

What is claimed is:

1. An apparatus for forming a registered ink-laden image on a non-planar printing surface of a shaped edible piece, the apparatus comprising:
    a transport surface including at least one shaped recess having a non-planar surface corresponding to the shaped edible piece and a vacuum hole positioned within the shaped recess, said edible piece being laterally, longitudinally and rotationally positioned within the shaped recess at a predetermined position;
    a first printer station at a first position along a transport path that applies a first component image of said registered image in ink on the shaped piece while in the predetermined position;
    a second printer station downstream from the first position that applies a second component image of said registered image on the edible piece in registration with the first component image of the registered image;
    a vacuum pump in communication with and applying a pressure differential to the vacuum hole to maintain the edible piece in the predetermined position within the recess while the edible piece is at and between the first and second print stations; and
    a valve system connected to the vacuum pump that applies a first pressure differential at the printer stations and a second pressure differential, less than the first pressure differential, between the printer stations.

2. The apparatus according to claim 1, wherein the non-planar printing surface of said edible piece protrudes above the transport surface.

3. The apparatus according to claim 1, wherein the vacuum hole is positioned at a deepest portion of said shaped recess.

4. The apparatus according to claim 1, wherein the vacuum hole is positioned on a side wall of the shaped recess.

5. The apparatus according to claim 1, further comprising a vacuum plenum system between the shaped recesses and the vacuum pump and disposed below the transport path.

6. The apparatus according to claim 5, wherein the vacuum plenum system includes first and second portions that extend transverse to the transport path below the first and second print stations, respectively, and a third portion including sub-plenums that extend parallel to the transport path between the first and second print stations.

7. The apparatus according to claim 6, wherein the first and second portions of the plenum system are subject to first and second pressure differentials and that are substantially equal, and the third portion of the plenum system is subject to a third pressure differential less than the first and second pressure differentials.

8. The apparatus according to claim 6, wherein the transport surface comprises at least one carrier bar including a row of shaped recesses identical to said at least one shaped recess, wherein said first and second portions or the plenum system are dimensional to have widths substantially equal to a width of the row of shaped recesses on the carrier bar.

9. The apparatus according to claim 8, wherein each of said sub-plenums in said third portion of said plenum system corresponds to one of said shaped recesses in said row.

10. The apparatus according to claim 1, wherein said transporting recess portion includes a resilient portion.

11. The apparatus according to claim 1, wherein said apparatus comprises a multi-lane system and total output of said apparatus is at least 1,000 pieces per lane per hour.

12. The apparatus according to claim 1, wherein said first printing station or said second printing station comprises an offset printer.

13. The apparatus according to claim 1, wherein said first printing station or said second printing station comprises an inkjet printer.

14. An apparatus for printing a multicolor composite image formed from at least two component ink-laden images on a plurality of shaped confectionery pieces each having at least one non-planar surface, said apparatus comprising:

means for printing a first component ink-laden image on said at least one non-planar surface of said shaped confectionery pieces at a first print position;

means for printing a subsequent second component ink-laden image on said at least one non-planar surface of said shaped confectionery pieces at a second print position;

means for moving a transport surface including said shaped confectionery pieces from said first print position to said second print position, wherein said transport surface includes a plurality of transport recess portions each provided with at least one vacuum hole; and means for positioning said shaped confectionery pieces in a predetermined location temporarily fixed laterally, longitudinally and rotationally at least in part by vacuum pressure within a respective one of said transport recess portions at least at and between the first and second print positions, to thereby maintain registration of said first component ink-laden image relative to said second component ink-laden image so as to enable said multicolor composite image to be formed.

* * * * *

UNITED STATES PATENT AND TRADEMARK OFFICE
CERTIFICATE OF CORRECTION

PATENT NO. : 7,182,018 B2
APPLICATION NO. : 10/619571
DATED : February 27, 2007
INVENTOR(S) : E. Michael Ackley, Jr. et al.

It is certified that error appears in the above-identified patent and that said Letters Patent is hereby corrected as shown below:

ON COVER PAGE AT (56) FOREIGN PATENT DOCUMENTS

"EP   091377   A1   6/1999" should read --EP   0919377   A1   6/1999--.

COLUMN 1

Line 61, "require" should read --requires--.

COLUMN 13

Line 53, "be" should be deleted.

COLUMN 14

Line 35, "a" should be deleted.

COLUMN 16

Line 29, "be all" should read --all be--.

Signed and Sealed this

Twenty-eighth Day of August, 2007

JON W. DUDAS
*Director of the United States Patent and Trademark Office*